(12) United States Patent
Allen et al.

(10) Patent No.: US 10,380,257 B2
(45) Date of Patent: *Aug. 13, 2019

(54) GENERATING ANSWERS FROM CONCEPT-BASED REPRESENTATION OF A TOPIC ORIENTED PIPELINE

(71) Applicant: International Business Machines Corporation, Armonk, NY (US)

(72) Inventors: Corville O. Allen, Morrisville, NC (US); Joseph N. Kozhaya, Morrisville, NC (US); Christopher M. Madison, Charlotte, NC (US); Sai P. Peddi, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 100 days.

This patent is subject to a terminal disclaimer.

(21) Appl. No.: 14/867,720

(22) Filed: Sep. 28, 2015

(65) Prior Publication Data

US 2017/0091314 A1     Mar. 30, 2017

(51) Int. Cl.
*G06F 17/30* (2006.01)
*G06F 17/27* (2006.01)

(52) U.S. Cl.
CPC .................. *G06F 17/2785* (2013.01)

(58) Field of Classification Search
CPC .... G06F 16/322; G06F 16/3344; G06F 16/35; G06F 17/2211; G06F 17/2247;
(Continued)

(56) References Cited

U.S. PATENT DOCUMENTS

| 6,112,203 A | 8/2000 | Bharat et al. |
| 6,154,213 A | 11/2000 | Rennison et al. |

(Continued)

FOREIGN PATENT DOCUMENTS

| JP | 2013254420 A | 12/2013 |
| WO | 2010105214 A2 | 9/2010 |

OTHER PUBLICATIONS

ACL, "TextGraphs-5: Graph-based Methods for Natural Language Processing," 2010 Workshop on Graph-based Methods for Natural Language Processing Proceedings, Jul. 16, 2010, p. 1-109, The Association for Computational Linguistics, Uppsala University, Uppsala, Sweden.

(Continued)

*Primary Examiner* — Angela A Armstrong
(74) *Attorney, Agent, or Firm* — Robert C. Bunker (57) ABSTRACT

According to one exemplary embodiment, a method for generating an answer in a question answering system is provided. The method may include receiving a question. The method may also include identifying a candidate answer from a corpus. The method may then include determining a plurality of sentences based on the identified candidate answer. The method may further include calculating a similarity value for each sentence within the plurality of sentences based on comparing the plurality of sentences to the candidate answer and the received question. The method may also include identifying at least one sentence within the plurality of sentences with a calculated similarity value that exceeds a threshold value. The method may then include generating the answer based on the candidate answer and the identified at least one sentence.

14 Claims, 6 Drawing Sheets

(58) Field of Classification Search
CPC .............. G06F 17/271; G06F 17/2785; G06F 17/30657; G06F 17/30675
See application file for complete search history.

(56) References Cited

U.S. PATENT DOCUMENTS

| | | | |
|---|---|---|---|
| 6,321,220 | B1 | 11/2001 | Dean et al. |
| 6,810,376 | B1 | 10/2004 | Guan et al. |
| 7,017,114 | B2 | 3/2006 | Guo et al. |
| 8,024,332 | B2 | 9/2011 | Cao et al. |
| 8,732,204 | B2 | 5/2014 | Chua et al. |
| 8,887,044 | B1 | 11/2014 | Goodspeed et al. |
| 8,892,672 | B1 | 11/2014 | Rackliffe |
| 8,983,977 | B2 | 3/2015 | Ishikawa et al. |
| 9,183,323 | B1* | 11/2015 | Shaw .................. G06F 17/3097 |
| 9,299,024 | B2 | 3/2016 | Bagchi et al. |
| 9,336,485 | B2 | 5/2016 | Haggar et al. |
| 9,514,190 | B2 | 12/2016 | Clifford et al. |
| 9,720,977 | B2 | 8/2017 | Jamrog et al. |
| 9,842,166 | B1 | 12/2017 | Leviathan et al. |
| 2003/0182631 | A1 | 9/2003 | Tsochantaridis et al. |
| 2004/0181757 | A1 | 9/2004 | Brady et al. |
| 2004/0213455 | A1 | 10/2004 | Lossev |
| 2006/0195463 | A1 | 8/2006 | Bogner |
| 2009/0112588 | A1 | 4/2009 | Kummamuru et al. |
| 2010/0030769 | A1 | 2/2010 | Cao et al. |
| 2010/0063797 | A1 | 3/2010 | Cong et al. |
| 2010/0076978 | A1 | 3/2010 | Cong et al. |
| 2010/0235311 | A1 | 9/2010 | Cao et al. |
| 2010/0235343 | A1 | 9/2010 | Cao et al. |
| 2011/0252121 | A1 | 10/2011 | Borgs et al. |
| 2012/0209590 | A1* | 8/2012 | Huerta ................ G06F 17/2818 704/7 |
| 2012/0290950 | A1 | 11/2012 | Rapaport et al. |
| 2013/0013291 | A1* | 1/2013 | Bullock .............. G06F 17/2785 704/9 |
| 2013/0097167 | A1 | 4/2013 | St. Jacques, Jr. et al. |
| 2013/0198240 | A1 | 8/2013 | Ameri-Yahia et al. |
| 2013/0263181 | A1 | 10/2013 | Impollonia et al. |
| 2014/0098103 | A1 | 4/2014 | Hirsch |
| 2014/0280224 | A1 | 9/2014 | Feinberg et al. |
| 2014/0280307 | A1 | 9/2014 | Gupta et al. |
| 2014/0298199 | A1 | 10/2014 | Johnson, Jr. et al. |
| 2014/0358928 | A1 | 12/2014 | Alkov et al. |
| 2015/0006537 | A1 | 1/2015 | Jenkins et al. |
| 2015/0074095 | A1 | 3/2015 | Enders et al. |
| 2015/0188941 | A1 | 7/2015 | Boshmaf |
| 2015/0324456 | A1* | 11/2015 | Kim .................. G06F 17/30654 707/722 |
| 2016/0019280 | A1 | 1/2016 | Unger et al. |
| 2016/0034757 | A1 | 2/2016 | Chhichhia et al. |
| 2016/0063061 | A1 | 3/2016 | Meyerzon et al. |
| 2016/0063115 | A1 | 3/2016 | Ayan |
| 2016/0154727 | A1 | 6/2016 | Broomhall |
| 2016/0198005 | A1 | 7/2016 | Brewer |
| 2016/0203523 | A1 | 7/2016 | Spasojevic et al. |
| 2016/0232157 | A1 | 8/2016 | Mansour et al. |
| 2016/0232241 | A1 | 8/2016 | Stoyanov |
| 2016/0371277 | A1 | 12/2016 | Allen et al. |
| 2016/0371393 | A1 | 12/2016 | Allen et al. |
| 2017/0091188 | A1 | 3/2017 | Allen et al. |

OTHER PUBLICATIONS

Dali et al., "Question Answering Based on Semantic Graphs," WWW 2009, Apr. 2009, 7 Pages, Jožef Stefan Institute, Madrid, Spain.

Gómez-Adorno et al., "Graph-based Approach to the Question Answering Task Based on Entrance Exams," CEUR Workshop Proceedings, CLEF 2014, Sep. 15-18, 2014, p. 1395-1403, vol. 1180, Sheffield, UK.

Kurata et al., "GDQA: Graph Driven Question Answering System," NTCIR-4 QAC2 Experiments, Working Notes of NTCIR-4, Jun. 2-4, 2004, 7 Pages, National Institute of Informatics, Tokyo.

Mell et al., "The NIST Definition of Cloud Computing," National Institute of Standards and Technology, Sep. 2011, p. 1-3, Special Publication 800-145.

Mollá, "Learning of Graph-based Question Answering Rules," HLT-NAACL 2006 Workshop on TextGraphs, Jun. 2006, p. 37-44, Association for Computational Linguistics, New York City.

Paranjpe, "Clustering Semantically Similar and Related Questions," Stanford Natural Language Processing Final Project, 2007, 8 Pages.

Seo et al., "High Precision Retrieval Using Relevance-Flow Graph," SIGIR'09, Jul. 19-23, 2009, 2 Pages, ACM, Boston, Massachusetts, USA.

Vargas-Vera et al., "AQUA: An Ontology-Driven Question Answering System," AAAI Technical Report SS-03-07, 2003, 5 Pages, American Association for Artificial Intelligence.

Zhang et al., "A Topic Clustering Approach to Finding Similar Questions from Large Question and Answer Archives," PLoS One, Mar. 2014, p. 1-8, vol. 9, Issue 3.

IBM, "List of IBM Patents or Patent Applications Treated as Related (Appendix P)," Sep. 28, 2015, p. 1-2.

Allen et al., "Presenting Answers From Concept-Based Representation of a Topic Oriented Pipeline," Application and Drawings, filed Sep. 28, 2015, p. 1-37, U.S. Appl. No. 14/867,737.

IBM, "List of IBM Patents or Patent Applications Treated as Related (Appendix P)," Jan. 29, 2018, p. 1-2.

* cited by examiner

GENERATING ANSWERS FROM CONCEPT-BASED REPRESENTATION OF A TOPIC ORIENTED PIPELINE

BACKGROUND

The present invention relates generally to the field of cognitive computing, and more particularly to topic oriented question answer systems.

When presented with a question, a topic oriented question answer system identifies the most relevant topics to that question from a corpus of knowledge and returns the topics as candidate answers.

SUMMARY

According to one exemplary embodiment, a method for generating an answer in a question answering system is provided. The method may include receiving a question. The method may also include identifying a candidate answer from a corpus. The method may then include determining a plurality of sentences based on the identified candidate answer. The method may further include calculating a similarity value for each sentence within the plurality of sentences based on comparing the plurality of sentences to the candidate answer and the received question. The method may also include identifying at least one sentence within the plurality of sentences with a calculated similarity value that exceeds a threshold value. The method may then include generating the answer based on the candidate answer and the identified at least one sentence.

According to another exemplary embodiment, a computer system for generating an answer in a question answering system is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a question. The method may also include identifying a candidate answer from a corpus. The method may then include determining a plurality of sentences based on the identified candidate answer. The method may further include calculating a similarity value for each sentence within the plurality of sentences based on comparing the plurality of sentences to the candidate answer and the received question. The method may also include identifying at least one sentence within the plurality of sentences with a calculated similarity value that exceeds a threshold value. The method may then include generating the answer based on the candidate answer and the identified at least one sentence.

According to yet another exemplary embodiment, a computer program product for generating an answer in a question answering system is provided. The computer program product may include one or more computer-readable storage devices and program instructions stored on at least one of the one or more tangible storage devices, the program instructions executable by a processor. The computer program product may include program instructions to receive a question. The computer program product may also include program instructions to identify a candidate answer from a corpus. The computer program product may then include program instructions to determine a plurality of sentences based on the identified candidate answer. The computer program product may further include program instructions to calculate a similarity value for each sentence within the plurality of sentences based on comparing the plurality of sentences to the candidate answer and the received question. The computer program product may also include program instructions to identify at least one sentence within the plurality of sentences with a calculated similarity value that exceeds a threshold value. The computer program product may then include program instructions to generate the answer based on the candidate answer and the identified at least one sentence.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for generating answers in a topic oriented pipeline using sentence similarity. As such, the present embodiment has the capacity to improve the technical field of query answering with topic oriented pipelines by breaking down topics into sentences and combining similar sentences to form concise answers. More specifically, as documents are ingested into the topic oriented pipeline and broken down into topics, each topic may be further broken down into constituent sentences. Thereafter, the constituent sentences may be used as a basis to create a graph structure representing the sentences within the topic. Edges within the graph connecting nodes that correspond with constituent sentences may be assigned edge weights indicating sentence similarity between nodes (i.e., constituent sentences). Once a question is received by the topic oriented pipeline, candidate answers may be determined. Each candidate answer may then be analyzed to determine sentences that are similar to the candidate answer based on the generated graph. A subgraph may then be generated based on the candidate answer, similar sentences and the question. Then, a clique of sentences may be determined that includes sentences that may be similar to the question and the clique of sentences may be returned as an answer.

Existing topic oriented pipelines execute by breaking a corpus of N documents into K sub-documents (i.e., topics) based on the structure of the original documents whereby K is larger than N. In some instances, K may be much larger than N depending on the structure of the original N documents. The structure of the document may be defined by the use of formatting tags, such as H tags (or headings in the case of .doc files or fonts in the case of a .pdf file).

When presented with a question, the topic oriented pipeline identifies the most relevant topic(s) to that question and returns those identified topic(s) as the answers. Topics may be returned as a whole passage containing the multiple sentences. By returning the complete topic, some sentences may be included that are not relevant and that may obfuscate the answer to the question.

Therefore, it may be advantageous to, among other things, provide a way to filter out sentences from the answers determined within a question answering system (i.e., topic oriented pipeline) that may be superfluous.

According to at least one embodiment, ingested corpus (e.g., text documents) may be broken down into topics, whereby each topic is made up of multiple elements (i.e., sentences). Topics may then be further broken down into M constituent sentences (i.e., sentences $S_1, S_2, \ldots, S_M$). Then, a graph structure may be created corresponding to a topic that has M nodes corresponding to each of the M constituent sentences.

Thereafter, the edges connecting nodes in the graph may be assigned edge weights based on comparing two sentences within the topic. According to at least one embodiment, edge weight may be determined based on if the two sentences appear in the same paragraph or if the two sentences are in two different paragraphs (i.e., the edge weight for an edge between two sentences in the same paragraph may be higher than for two sentences in different paragraphs). Similarly, edge weights may increase for edges between sentences that are closer together than for sentences further apart. According to at least one other embodiment, sentences may be analyzed to determine how strongly sentences are related using known methods, such as anaphora resolution. According to yet another embodiment, edge weight may be determined based on known methods for calculating sentence similarity, such as ngram, entropy, etc. Then, the topic oriented pipeline may continue to ingest corpus until presented with a question to answer.

According to at least one embodiment, once the topic oriented pipeline receives an input question, candidate answers are determined from ingested corpus using known methods. A list of candidate answers (e.g., individual sentences from within a topic) may be generated as candidate answers are identified. Once a list of candidate answers has been determined, a candidate answer may be selected for further analysis.

Then, the graph generated during corpus ingestion may be traversed to identify other constituent sentences within the topic that are strongly connected to the candidate answer sentence based on the edge weights assigned previously. Thereafter, a new subgraph may be generated including the candidate answer sentence and the strongly connected sentences identified previously. Additionally, the input question may be added to the subgraph and the edge weights from the input question to the other sentences within the subgraph may be updated using known sentence similarity measures as described previously.

Based on a predetermined threshold of similarity, a set of sentences from the subgraph (i.e., a clique of sentences) may be identified when an edge weight exceeds the threshold value. The candidate answer may then be rescored using known methods to indicate the probability that the candidate answer and the remaining identified set of sentences may be correct. Then, the set of sentences may be returned as an answer. The remaining candidate answer sentences may then be iteratively analyzed in a similar way and returned as answers until all candidate answer sentences have been analyzed.

Figure 1:
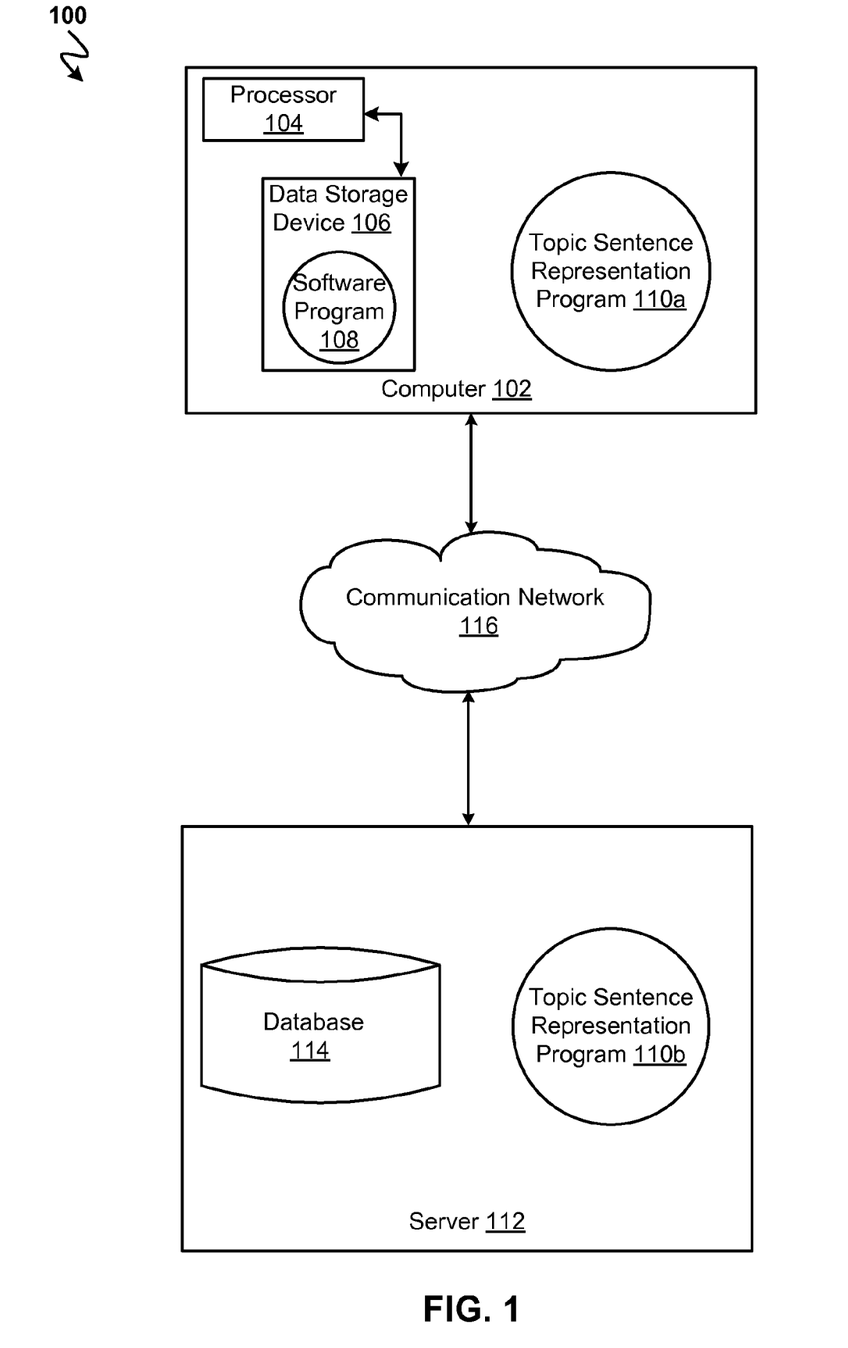
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a topic sentence representation program 110a. The networked computer environment 100 may also include a server 112 that is enabled to run a topic sentence representation program 110b that may interact with a database 114 and a communication network 116. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the topic sentence representation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the topic sentence representation program 110a, 110b (respectively) to answer questions associated with a topic oriented pipeline. The topic sentence representation method is explained in more detail below with respect to FIGS. 2 and 3.

Figure 2:
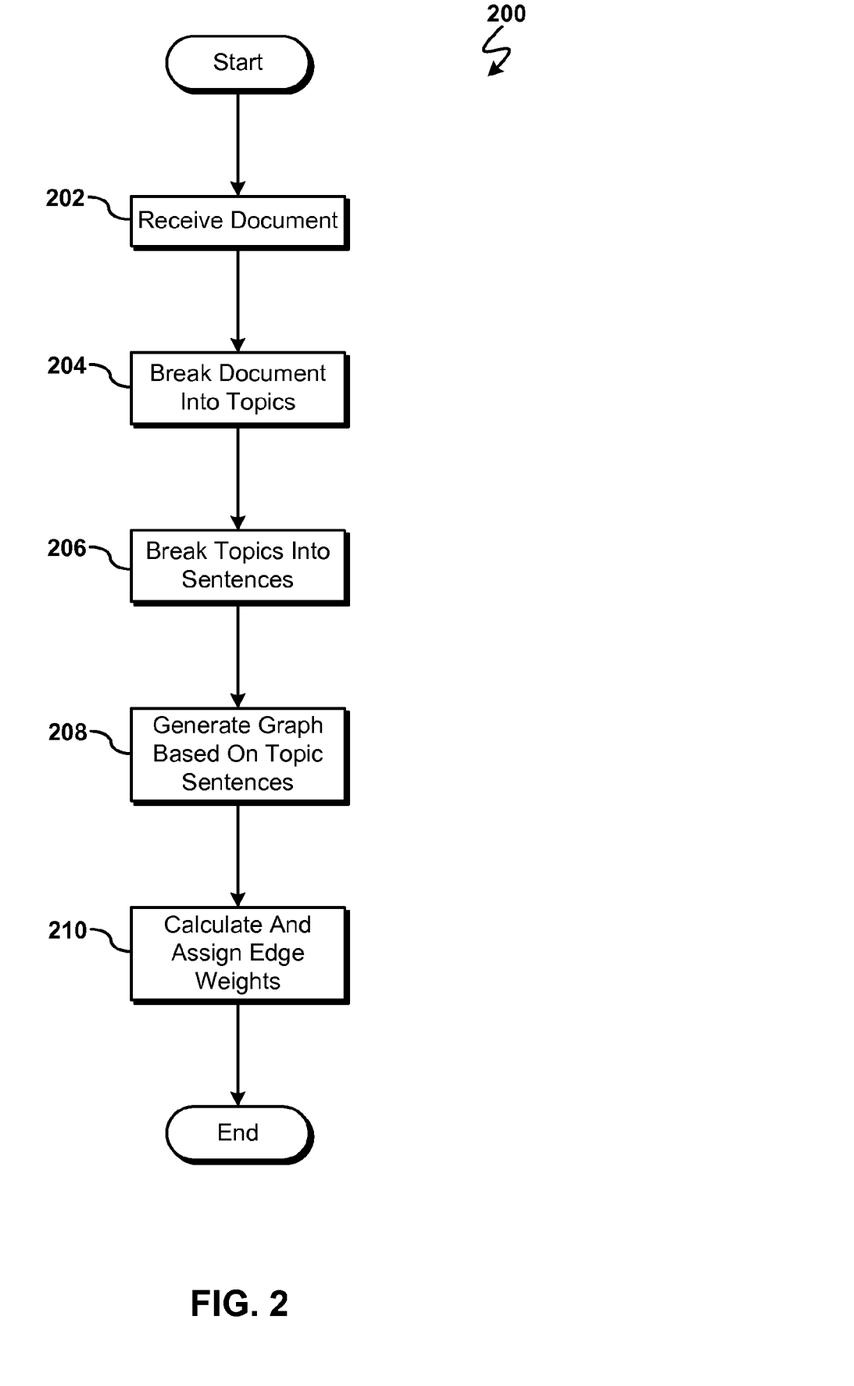
FIG. 2 is an operational flow chart illustrating a process for corpus ingestion according to at least one embodiment.

Referring now to FIG. 2, an operational flow chart illustrating the exemplary corpus ingestion process 200 by the topic sentence representation program 110a and 110b (FIG. 1) according to at least one embodiment is depicted.

At 202, a document (or other corpus) is received for ingesting into a question answering system, such as a topic oriented pipeline. According to at least one embodiment, the document ingestion is handled using known topic oriented pipeline corpus ingestion methods.

Then, at 204, the received document is broken down into topics. According to at least one embodiment, the document's formatting may be used to identify topics (i.e., passages containing one or more sentences). The structure of the document may be defined by the use of formatting tags, such as H tags (or headings in the case of .doc files or fonts in the case of a .pdf file). The sentences contained within a set of formatting tags may be identified as a topic. The document may then be iteratively broken into component topics until the whole document has been divided into topics. Text passages making up each topic may be stored in a data repository, such as a database 114 (FIG. 1).

Next, at 206, the topics determined at 204 are further broken down into individual sentences. According to at least one embodiment, using known string scanning methods, each sentence may be identified (e.g., scanning each character to identify punctuation or other sentence ending and/or starting indicators) and each sentence stored in a data structure, such as an array. For example, topic $T_1$ may contain N sentences. Thus topic $T_1$ may be broken down into the individual sentences $S_1, S_2, \ldots S_N$.

At 208, a graph structure is generated based on the sentences identified at 206. According to at least one embodiment, each sentence associated with a topic may be used to populate a graph structure. For example, if each sentence identified at 206 was stored as an array element in a sentence array, a graph node may be added for each array element (corresponding to a sentence). Thus, if there are 15 sentences in a topic, 15 array elements may be initialized, each containing a string with a sentence. Thereafter, nodes may be added to the graph having a sentence string as the node value. Nodes may be iteratively added to the graph until all array elements (e.g., 15) have been added as nodes, one node corresponding to one sentence. Additionally, the graph structure generated may be a complete graph (i.e., every pair of nodes in the graph is connected by a unique edge).

Then, at 210, edge weights are calculated and assigned to each edge in the graph. According to at least one embodiment, edge weight may be calculated to indicate how similar sentences are to each other. Edge weight calculation may be based on determining if the two sentences appear in the same paragraph or if the two sentences are in two different paragraphs (i.e., the edge weight for an edge between two sentences in the same paragraph may be higher than for two sentences in different paragraphs). Similarly, determined edge weights may increase for edges between sentences that are closer together than for sentences further apart. According to at least one other embodiment, sentences may be analyzed to determine how strongly sentences are related using known methods, such as anaphora resolution. According to yet another embodiment, edge weight may be determined based on known methods for calculating sentence similarity, such as ngram, entropy, etc. It may be appreciated that any single edge weight determination method may be used as well as a combination of edge weight determination methods.

Once the edge weights have been calculated and assigned, the corpus ingestion process 200 may handle any additional received corpus documents.

Figure 3:
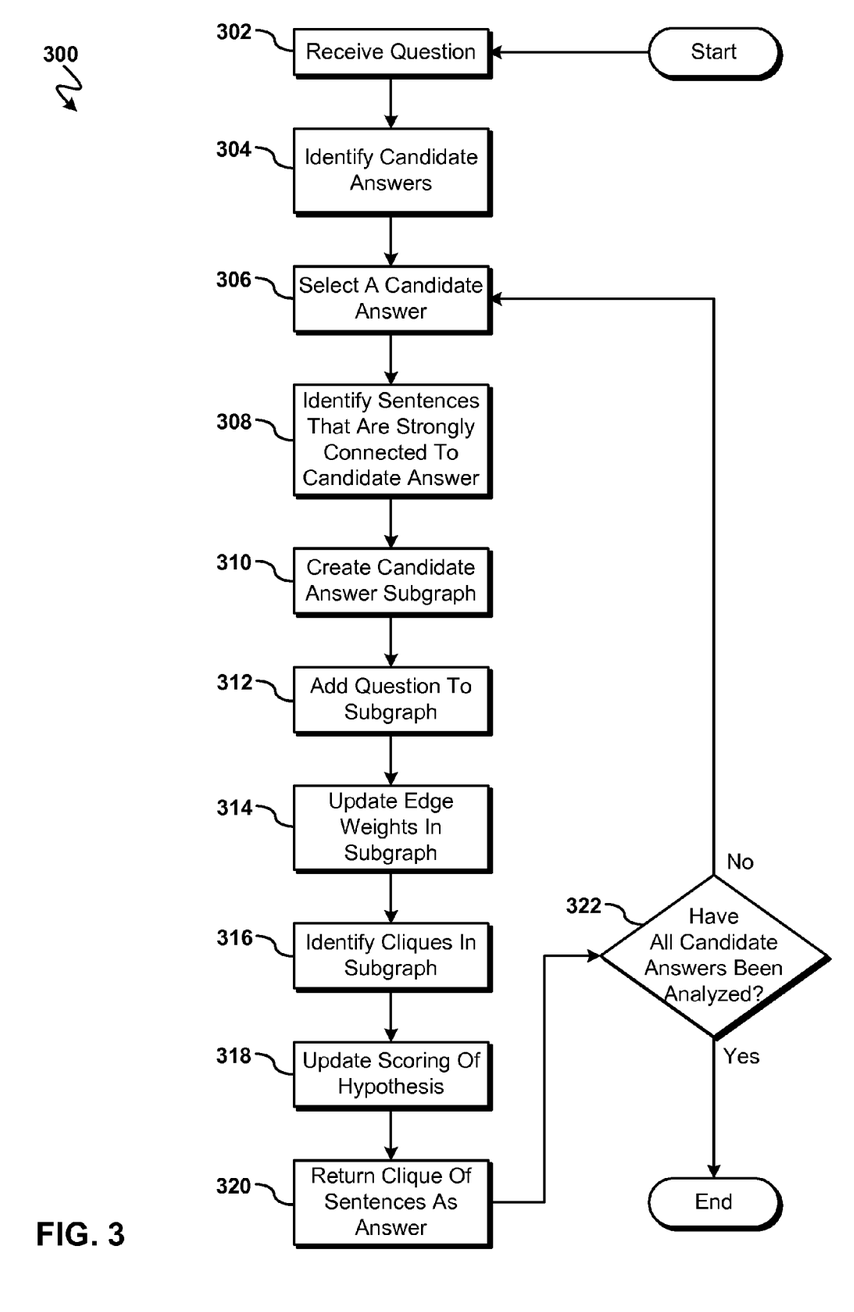
FIG. 3 is an operational flow chart illustrating a process for answering questions according to at least one embodiment.

Referring now to FIG. 3, an operational flow chart illustrating the exemplary question answering process 300 by the topic sentence representation program 110a and 110b (FIG. 1) according to at least one embodiment is depicted.

At 302, an input question is received by the question answering system (e.g., topic oriented pipeline). According to at least one embodiment, a topic oriented pipeline may receive an input question to answer.

Next, at 304, the question answering system identifies candidate answers from previously ingested corpus. According to at least one embodiment, known methods are used by the topic oriented pipeline to identify candidate answer sentences from within topics associated with ingested corpus (e.g., documents). The identified candidate answers may be stored as a list of entries having the candidate answer sentence along with other information, such as identifying the graph made previously at 208 (FIG. 2) containing the candidate answer sentence.

Then, at 306, a candidate answer sentence is selected from the identified candidate answers. According to at least one embodiment, the first unanalyzed entry in the list of identified candidate answers may be selected for further analysis. The entry may be read to obtain the candidate answer sentence along with the graph previously generated at 208 (FIG. 2) containing the other sentences within the topic associated with the candidate answer graph.

At 308, sentences that are strongly connected to the selected candidate answer are identified. According to at least one embodiment, the graph associated with the selected candidate answer may be traversed using a known graph traversal algorithm (e.g., depth-first search) to identify other sentences within the graph that are strongly connected to the candidate answer. Sentences may be identified as being strongly connected to the candidate answer sentence by comparing the edge weight assigned to the edge spanning between the node corresponding to the candidate answer and another sentence to a threshold value. If, as the graph is traversed, an edge from the node corresponding to the candidate answer sentence to a second node exceeds the threshold value, the sentence associated with the second node may be identified as strongly connected to the candidate answer sentence.

For example, in a scenario that includes edge weights within the topic graph containing the candidate answer sentence that have been normalized using a known normalization algorithm to be a value between 0.0 and 1.0, a predetermined threshold value of 0.75 may be specified. If an edge spanning between the node representing the candidate answer sentence and a second node has an edge weight of 0.86, the sentence associated with the second node may be identified as a strongly connected sentence since the edge weight (i.e., 0.86) exceeds the threshold value (i.e., 0.75).

Sentences identified as being strongly connected to the candidate answer sentence may then be added to and stored in a data structure, such as an array.

Next, at 310, a candidate answer subgraph is generated based on the candidate answer and the sentences strongly connected with the candidate answer sentence. According to at least one embodiment, a new graph structure may be initialized and have nodes added corresponding to the candidate answer sentence and the sentences identified as being strongly connected to the candidate answer sentence as described previously at 308. Additionally, the nodes in the subgraph may be connected by edges such that a complete graph is formed.

According to at least one embodiment, the subgraph's edges may be assigned edge weights that are the same edge weights that existed in the original graph generated previously at 208 (FIG. 2) between the node representing the candidate answer sentence and the nodes representing strongly connected sentences.

For example, an input question "What are the locations that IBM has offices in North Carolina?" may be received by a topic oriented pipeline. Based on searching the corpus, a candidate answer sentence "IBM is located in Raleigh, N.C." (i.e., $S_1$) may be identified. Based on the candidate answer, sentence $S_2$ "There are 700 employees at the Raleigh location," sentence $S_3$ "There is a huge IBM facility in Charlotte, N.C.," and sentence $S_4$ "There was a recent management change at the IBM Charlotte office" may be identified as being strongly connected to the candidate answer, $S_1$. From the identified sentences (i.e., $S_1$-$S_4$), a subgraph may be generated with four nodes: $N_1$ corresponding with the candidate answer $S_1$, $N_2$ corresponding with sentence $S_2$, $N_3$ corresponding with sentence $S_3$, and $N_4$ corresponding with sentence $S_4$. Furthermore, an edge may be generated to connect each node pair in the graph (e.g., edge $E_{12}$ connecting $N_1$ to $N_2$, edge $E_{23}$ connecting $N_2$ to $N_3$, etc.).

Then, at 312, the input question is added as a node to the previously generated subgraph. According to at least one embodiment, a node corresponding to the input question may be added to the subgraph using a known graph node insertion algorithm. Additionally, the added node may have a unique edge generated between the added node and each of the existing nodes in the subgraph.

Continuing the above example of the subgraph with nodes $N_1$-$N_4$, the input question (i.e., "What are the locations that IBM has offices in North Carolina?") may be added to the subgraph as node $N_5$. Additionally, edges may be added from $N_5$ to the rest of the nodes in the subgraph ($N_1$-$N_4$). Thus, the subgraph would contain nodes $N_1$-$N_5$ and all nodes may be connected by a unique edge.

At 314, edge weights for edges within the subgraph are updated based on the previously inserted node corresponding to the input question. According to at least one embodiment, the edge weights for the new edges spanning from the new node (i.e., node corresponding with the input question) to the existing subgraph nodes are assigned edge weights using known sentence similarity algorithms comparing the input question with the sentences represented in the rest of the subgraph (i.e., the candidate answer sentence and the sentences that were identified as being strongly connected to the candidate answer), as described previously.

For example, in the subgraph having nodes $N_1$-$N_5$, edge weights may be calculated for the edges spanning between the added node (i.e., $N_5$) and the other nodes (i.e., $N_1$-$N_4$). Using known similarity measures, the input question may be compared with another sentence. For example, the input question (i.e., "What are the locations that IBM has offices in North Carolina?") may be compared with sentence $S_1$ (i.e., "IBM is located in Raleigh, N.C.") and a normalized similarity measure of 0.98 may be generated since the two sentences are closely related. Thus, the edge (i.e., $E_{51}$) between the input question node (i.e., $N_5$) and the node corresponding to sentence $S_1$ (i.e., $N_1$) may be assigned an edge weight of 0.98. Then, the input question may be compared with the sentence $S_2$ (i.e., "There are 700 employees at the Raleigh location.") and result in a normalized similarity value of 0.61 since the two sentences are not closely related. The edge (i.e., $E_{52}$) between the input question node and the node corresponding to sentence $S_2$ (i.e., $N_2$) may thus be assigned an edge weight of 0.61. Next, the input question may be compared with the sentence $S_3$ (i.e., "There is a huge IBM facility in Charlotte, N.C.") and result in a normalized similarity value of 0.97 since the two sentences are closely related. The edge (i.e., $E_{53}$) between the input question node and the node corresponding to sentence $S_3$ (i.e., $N_3$) may thus be assigned an edge weight of 0.97. Finally, the input question may be compared with the sentence $S_4$ (i.e., "There was a recent management change at the IBM Charlotte office.") and result in a normalized similarity value of 0.59 since the two sentences are not closely related. The edge (i.e., $E_{54}$) between the input question node and the node corresponding to sentence $S_4$ (i.e., $N_4$) may thus be assigned an edge weight of 0.59.

It may be appreciated that other ways of updating the edge weights may be implemented, such as a hierarchal edge weighting scheme. For example, a hierarchal edge weighting scheme may identify a first node that is strongly connected to the question. Then an edge connecting the first node to a second node may be assigned an edge weight based on the similarity between the second node and the question combined with the first node. The second node may then be added to the first node and question to be compared with a third node, etc.

Next, at 316, a clique of sentences (i.e., set of sentences) is identified within the subgraph. According to at least one embodiment, the subgraph may be traversed using a known graph traversal algorithm (e.g., depth-first search) to identify sentences within the subgraph that are similar to the input question and sentences that may be similar to each other. Sentences may be identified as being similar by comparing the edge weight assigned to the edge spanning between two nodes in the subgraph to a predetermined similarity threshold value.

Edges within the subgraph may be analyzed to determine similarity between the added node corresponding to the input question and other nodes (i.e., edges spanning between the input question node and other nodes), as well as determine similarity the other nodes have between each other (e.g., edges that are not connected to the input question node). If, as the subgraph is traversed, an edge from a first node (e.g., corresponding to the input question) to a second node (e.g., corresponding to another sentence in the subgraph) exceeds the threshold value, the sentences corresponding to the first and second nodes may be added to the clique of sentences. Sentences added to the clique of sentences may be stored in a data structure, such as a list.

Continuing the example subgraph described previously having nodes $N_1$-$N_5$, edge weights associated with edges (i.e., $E_{51}$, $E_{52}$, $E_{53}$, and $E_{54}$) from the input question (i.e., $N_5$) to the rest of the nodes (i.e., $N_1$-$N_4$) may be iteratively compared against a predetermined threshold similarity value (e.g., 0.80).

First, edge $E_{51}$ having an edge weight of 0.98 may be compared against the threshold value of 0.80. Since the edge weight of $E_{51}$ exceeds the threshold value of 0.80, the sentence $S_1$ corresponding to $N_1$ is identified as part of the clique of sentences and added to a data structure, such as an array.

Next, edge $E_{52}$ having an edge weight of 0.61 may be compared against the threshold value of 0.80. Since the edge weight of $E_{52}$ does not exceed the threshold value of 0.80, the sentence $S_2$ corresponding to $N_2$ is identified as not being part of the clique of sentences and would not be added to the array containing the clique of sentences.

Then, edge $E_{53}$ having an edge weight of 0.97 may be compared against the threshold value of 0.80. Since the edge weight of $E_{53}$ exceeds the threshold value of 0.80, the sentence $S_3$ corresponding to $N_3$ is identified as part of the clique of sentences and added to the array containing the clique of sentences.

Finally, edge $E_{54}$ having an edge weight of 0.59 may be compared against the threshold value of 0.80. Since the edge weight of $E_{54}$ does not exceed the threshold value of 0.80, the sentence $S_4$ corresponding to $N_4$ is identified as not being part of the clique of sentences and would not be added to the array containing the clique of sentences. Thus, final clique of sentences may include sentences $S_1$ and $S_3$.

Then, at 318, the hypothesis (i.e., candidate answer) scoring is updated to include any additional sentences present in the clique of sentences. According to at least one embodiment, a known hypothesis scoring algorithm used by question answering systems (e.g., topic oriented pipeline) may be used to rescore the current hypothesis (i.e., the original hypothesis or candidate answer sentence, along with any additional sentences identified in the clique of sentences). A hypothesis scoring algorithm may, for example, take the current hypothesis (e.g., clique of sentences) and search through the corpus of accumulated data to search for evidence supporting and score the hypothesis based on the amount of support found in the corpus.

According to at least one other embodiment, sentence scoring may be based on how strongly connected (i.e., similar) the sentence is to the input question. For example, sentences within the clique of sentences that are strongly connected to the question may be scored high relative to sentences that are not strongly connected to the question.

At 320, the clique of sentences (i.e., candidate answer sentence and other sentences identified at 316) is returned as an answer with the answer's updated score. According to at least one embodiment, the clique of sentences and corresponding score are returned as an answer for the question answer system to use to rank and output answers later.

According to at least one other embodiment, the clique of sentences may be passed to a scoring and final merger module or candidate answer generation module of the question answer system to form a candidate answer from the clique of sentences and score the candidate answer. The candidate answer may then by assigned a higher ranking score based on the number of similar sentences and how strongly connected the similar sentences are to the candidate answer relative to candidate answers that have few similar sentences or sentences that are not as strongly connected.

Next, at 322, it is determined if all candidate answers have been analyzed. According to at least one embodiment, the list of candidate answers may be queried to determine if there are any entries that have not been analyzed.

If it is determined that there is a candidate answer that has not been analyzed at 322, the question answering process 300 will return to 306 to analyze the next unanalyzed candidate answer.

However, if it is determined that all candidate answer have been analyzed at 322, the question answering process 300 may end and the question answering system (e.g., topic oriented pipeline) may proceed to perform other actions incident to generating answers to the input question.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
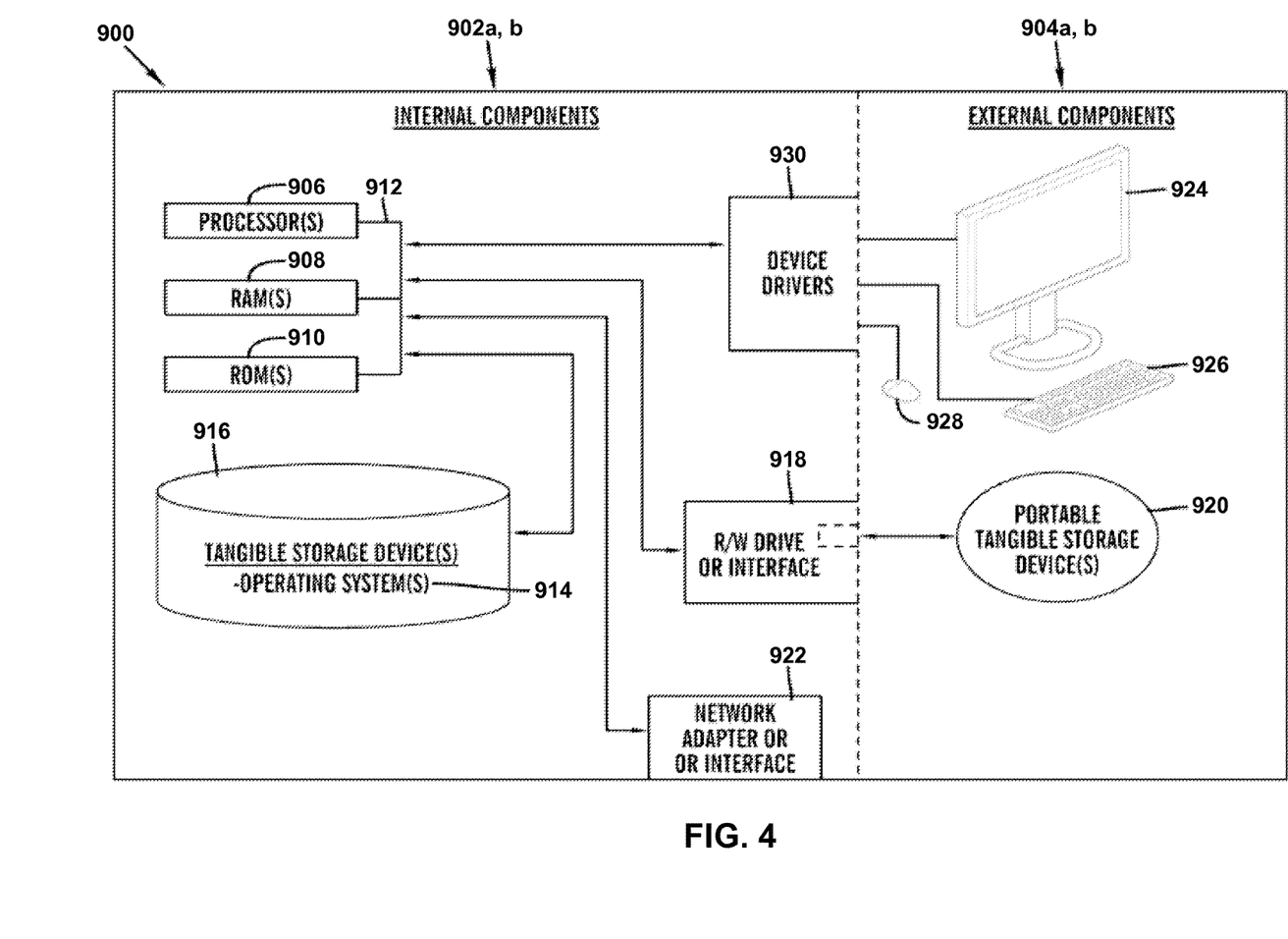
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the software program 108 (FIG. 1) and the topic sentence representation program 110a (FIG. 1) in client computer 102 (FIG. 1) and the topic sentence representation program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the topic sentence representation program 110a and 110b (FIG. 1) can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the topic sentence representation program 110a (FIG. 1) in client computer 102 (FIG. 1) and the topic sentence representation program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the topic sentence representation program 110a (FIG. 1) in client computer 102 (FIG. 1) and the topic sentence representation program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
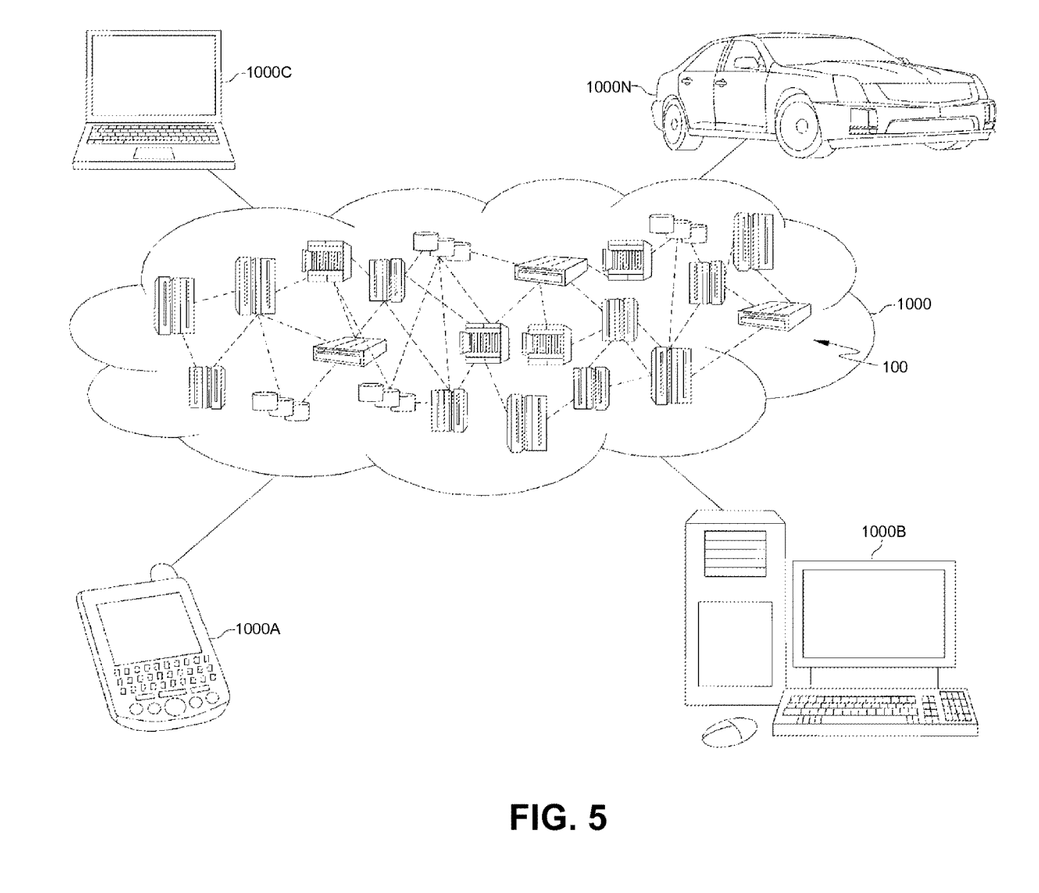
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
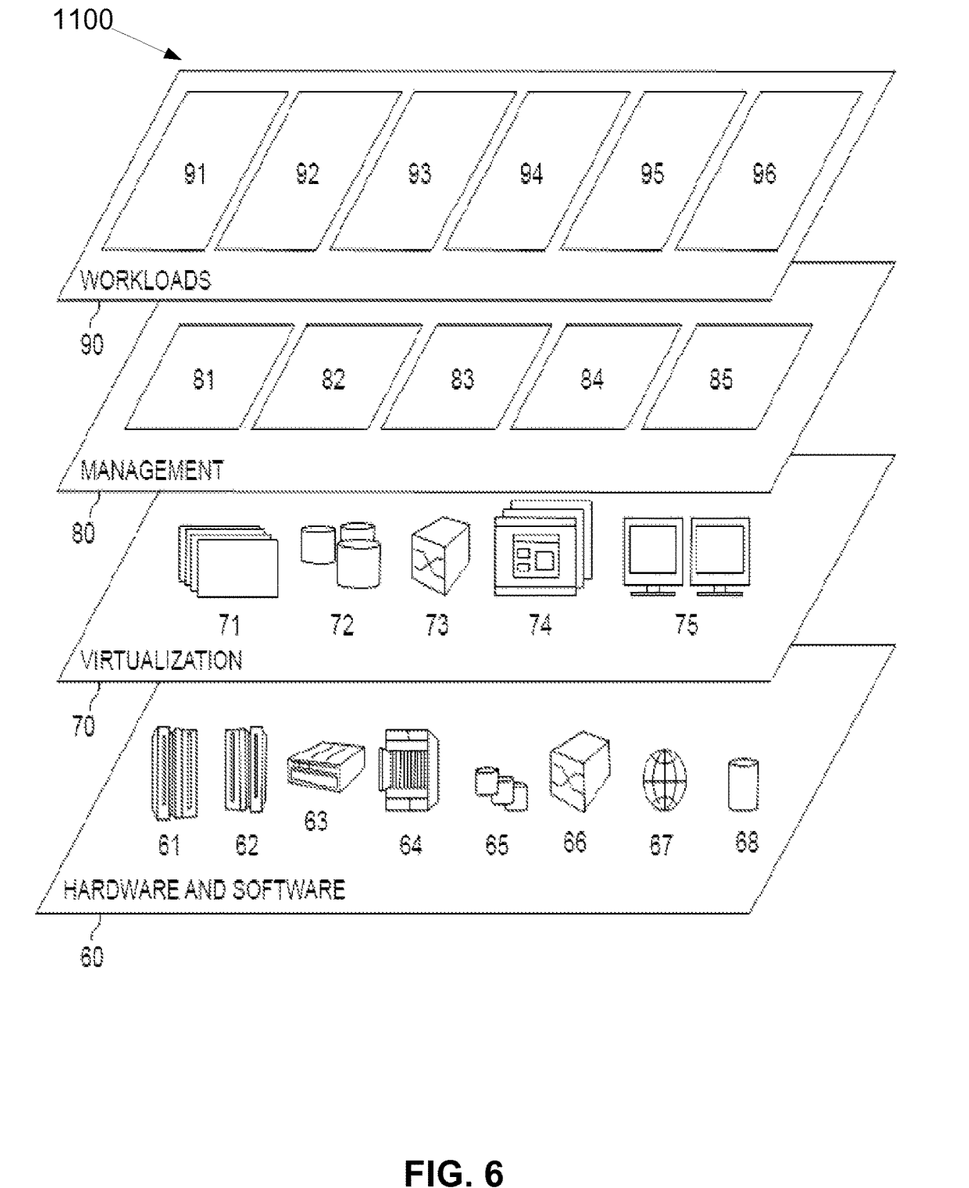
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and topic sentence representation 96. A topic sentence representation program 110*a*, 110*b* (FIG. 1) provides a way to represent sentences within a topic in a graph and determine sentence similarity to an input question, whereby sentences having sufficient similarity to the input question may be returned as an answer to a topic oriented pipeline.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating an answer in a topic oriented pipeline answering system, the method comprising:
   receiving a question;
   identifying a candidate answer from a plurality of topics stored in a topic database, wherein the plurality of topics is derived from a corpus of textual documents;
   determining a plurality of sentences based on the identified candidate answer;
   generating a subgraph based on the plurality of sentences and the candidate answer, wherein the subgraph has a plurality of edges and a plurality of nodes corresponding to the plurality of sentences and the candidate answer;
   adding a first node to the subgraph corresponding to the received question, wherein adding the first node includes adding a plurality of question edges to the plurality of edges, and wherein the added plurality of question edges span between the added first node and each node within the plurality of nodes of the generated subgraph;
   calculating a similarity value for each sentence within the plurality of sentences based on comparing the plurality of sentences to the candidate answer and the received question, wherein the calculated similarity value incorporates a distance between the plurality of sentences within the corpus of textual documents that the plurality of sentences was derived from;
   assigning an edge weight to each edge within the plurality of edges based on the calculated similarity value for each sentence within the plurality of sentences;
   identifying at least one sentence within the plurality of sentences with the assigned edge weight that exceeds a threshold value by traversing the generated subgraph;
   generating the answer, wherein the generated answer comprises the candidate answer and the identified at least one sentence;
   determining a score for the generated answer based on an amount of supporting evidence found by searching the corpus; and
   outputting the generated answer and the determined score.

2. The method of claim 1, wherein generating the answer based on the candidate answer and the identified at least one sentence comprises sending the candidate answer and identified at least one sentence to a scoring and final merger module associated with the question answer system, and wherein the scoring and final merger module calculates a ranking score associated with the candidate answer based on the identified at least one sentence.

3. The method of claim 1, further comprising:
   receiving a document;
   determining a plurality of topics based on the received document;
   determining a plurality of topic sentences for each topic within the plurality of topics;

generating a topic graph based on the determined plurality of topic sentences, wherein the topic graph includes a plurality of topic edges; and calculating a plurality of topic edge weights corresponding to the plurality of topic edges based on the similarity of a pair of topic sentences within the plurality of topic sentences.

4. The method of claim 3, wherein determining the plurality of sentences based on the identified candidate answer comprises comparing the similarity of the candidate answer to the plurality of topic sentences represented in the generated topic graph.

5. The method of claim 3, wherein the candidate answer comprises a topic sentence within the plurality of topic sentences.

6. The method of claim 1, wherein calculating the plurality of edge weights to the plurality of edges based on the similarity between the first node and the plurality of nodes comprises comparing the received question corresponding to the first node with a second sentence corresponding with a second node within the plurality of nodes.

7. A computer system for generating an answer in a topic oriented pipeline answering system, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving a question;

identifying a candidate answer from a plurality of topics stored in a topic database, wherein the plurality of topics is derived from a corpus of textual documents;

determining a plurality of sentences based on the identified candidate answer;

generating a subgraph based on the plurality of sentences and the candidate answer, wherein the subgraph has a plurality of edges and a plurality of nodes corresponding to the plurality of sentences and the candidate answer;

adding a first node to the subgraph corresponding to the received question, wherein adding the first node includes adding a plurality of question edges to the plurality of edges, and wherein the added plurality of question edges span between the added first node and each node within the plurality of nodes of the generated subgraph;

calculating a similarity value for each sentence within the plurality of sentences based on comparing the plurality of sentences to the candidate answer and the received question, wherein the calculated similarity value incorporates a distance between the plurality of sentences within the corpus of textual documents that the plurality of sentences was derived from;

assigning an edge weight to each edge within the plurality of edges based on the calculated similarity value for each sentence within the plurality of sentences;

identifying at least one sentence within the plurality of sentences with the assigned edge weight that exceeds a threshold value by traversing the generated subgraph;

generating the answer, wherein the generated answer comprises the candidate answer and the identified at least one sentence;

determining a score for the generated answer based on an amount of supporting evidence found by searching the corpus; and outputting the generated answer and the determined score.

8. The computer system of claim 7, wherein generating the answer based on the candidate answer and the identified at least one sentence comprises sending the candidate answer and identified at least one sentence to a scoring and final merger module associated with the question answer system, and wherein the scoring and final merger module calculates a ranking score associated with the candidate answer based on the identified at least one sentence.

9. The computer system of claim 7, further comprising:

receiving a document;

determining a plurality of topics based on the received document;

determining a plurality of topic sentences for each topic within the plurality of topics;

generating a topic graph based on the determined plurality of topic sentences, wherein the topic graph includes a plurality of topic edges; and calculating a plurality of topic edge weights corresponding to the plurality of topic edges based on the similarity of a pair of topic sentences within the plurality of topic sentences.

10. The computer system of claim 9, wherein determining the plurality of sentences based on the identified candidate answer comprises comparing the similarity of the candidate answer to the plurality of topic sentences represented in the generated topic graph.

11. The computer system of claim 9, wherein the candidate answer comprises a topic sentence within the plurality of topic sentences.

12. The computer system of claim 7, wherein calculating the plurality of edge weights to the plurality of edges based on the similarity between the first node and the plurality of nodes comprises comparing the received question corresponding to the first node with a second sentence corresponding with a second node within the plurality of nodes.

13. A computer program product for generating an answer in a topic oriented pipeline answering system, comprising:

one or more computer-readable storage medium and program instructions stored on at least one of the one or more tangible storage medium, the program instructions executable by a processor, the program instructions comprising:

program instructions to receive a question;

program instructions to identify a candidate answer from a plurality of topics stored in a topic database, wherein the plurality of topics is derived from a corpus of textual documents;

program instructions to determine a plurality of sentences based on the identified candidate answer;

program instructions to generate a subgraph based on the plurality of sentences and the candidate answer, wherein the subgraph has a plurality of edges and a plurality of nodes corresponding to the plurality of sentences and the candidate answer;

program instructions to add a first node to the subgraph corresponding to the received question, wherein adding the first node includes adding a plurality of question edges to the plurality of edges, and wherein the added plurality of question edges span between the added first node and each node within the plurality of nodes of the generated subgraph;

program instructions to calculate a similarity value for each sentence within the plurality of sentences based on comparing the plurality of sentences to the candidate answer and the received question, wherein the calculated similarity value incorporates a distance between the plurality of sentences within the corpus of textual documents that the plurality of sentences was derived from;

program instructions to assign an edge weight to each edge within the plurality of edges based on the calculated similarity value for each sentence within the plurality of sentences;

program instructions to identify at least one sentence within the plurality of sentences with the assigned edge weight that exceeds a threshold value by traversing the generated subgraph;

program instructions to generate the answer, wherein the generated answer comprises the candidate answer and the identified at least one sentence;

program instructions to determine a score for the generated answer based on an amount of supporting evidence found by searching the corpus; and program instructions to output the generated answer and the determined score.

14. The computer program product of claim 13, wherein generating the answer based on the candidate answer and the identified at least one sentence comprises sending the candidate answer and identified at least one sentence to a scoring and final merger module associated with the question answer system, and wherein the scoring and final merger module calculates a ranking score associated with the candidate answer based on the identified at least one sentence.

* * * * *